United States Patent [19]

Blackborow et al.

[11] Patent Number: 5,454,964
[45] Date of Patent: Oct. 3, 1995

[54] SUBSTITUTED ACYLATING AGENTS

[75] Inventors: John R. Blackborow, Edinburgh; John McMahon, Linlithgow, both of Scotland

[73] Assignee: BP Chemicals Limited, London, England

[21] Appl. No.: 234,045

[22] Filed: Apr. 28, 1994

[30]     Foreign Application Priority Data

May 4, 1993 [GB]  Great Britain .................... 9309121

[51] Int. Cl.$^6$ ............... C10M 145/00; C07D 307/60
[52] U.S. Cl. .................... 252/56 D; 44/351; 549/233; 549/255; 525/285; 525/301
[58] Field of Search ................. 549/233, 255; 252/56 D

[56]              References Cited

U.S. PATENT DOCUMENTS

| | | | |
|---|---|---|---|
| 3,030,387 | 4/1962 | Benoit, Jr. | 549/233 |
| 3,231,587 | 1/1966 | Rense | 549/233 |
| 3,288,714 | 11/1966 | Osuch | 549/255 |
| 3,474,110 | 10/1969 | Merijan et al. | 549/233 |
| 4,086,251 | 4/1978 | Cengel et al. | 549/255 |
| 4,431,825 | 2/1986 | Powell | 549/255 |
| 4,434,071 | 2/1984 | Powell | 549/233 |
| 4,514,544 | 4/1985 | Takahashi et al. | 525/327.4 |
| 4,581,464 | 4/1986 | Ross et al. | 549/233 |
| 4,599,433 | 7/1986 | Bronstert et al. | 549/255 |
| 5,071,919 | 12/1991 | DeGonia et al. | 525/285 |
| 5,137,980 | 8/1992 | Degonia et al. | 525/327.6 |
| 5,137,987 | 8/1992 | Degonia et al. | 525/285 |

FOREIGN PATENT DOCUMENTS

| | | |
|---|---|---|
| 0014288 | 8/1980 | European Pat. Off. . |
| 0082601 | 6/1983 | European Pat. Off. . |
| 0355895 | 2/1990 | European Pat. Off. . |
| 0457599 | 11/1991 | European Pat. Off. . |
| 1157972 | 6/1989 | Japan ........................ 549/255 |

*Primary Examiner*—Ellen M. McAvoy
*Attorney, Agent, or Firm*—Brooks Haidt Haffner & Delahunty

[57]               ABSTRACT

This invention relates to a process for producing substituted acylating agents by the reaction of an enophile with an ene by the thermal route wherein (a) the molar ratio of the enophile to the ene is at least 3:1 and (b) the reaction pressure is raised to above 20 psig an least after addition of the enophile reaction to the reaction is completed and is maintained substantially constant until at least 80% of the ene reactant has been converted to the corresponding acylating agent. The agents so produced are substantially free of chlorine and can be further reacted with an amine or a hydroxy compound to form a derivative which can be used as an additive for a lubricating oil or a fuel.

12 Claims, No Drawings

SUBSTITUTED ACYLATING AGENTS

The present invention relates to new and improved substituted acylating agents, especially polypropenyl- or polybutenyl-substituted acylating agents and a process for producing the same.

It is well known to produce substituted acylating agents by reaction of an ene compound such as polypropylene or polybutene with an enophile, eg maleic anhydride. One such route, the so called "chlorination route" involves the use of chlorine to activate the double bonds in the ene compound by forming the corresponding chlorinated derivative and the chlorinated derivative so formed is subsequently functionalised by reaction with the enophile such as maleic anhydride to form the substituted acylating agent. This route is efficient and leads to high conversions to the substituted acylating agent. However, a serious drawback is the problem of chlorine incorporation into the substituted acylating agent which has become increasingly unacceptable, especially when such agents are used in the production of lubricating oil or fuel additives.

The other route is the so called "thermal route" in which the ene, eg a polypropylene or a polybutene, and the enophile, eg maleic anhydride, are simply heated up, optionally in the presence of a catalyst or other additive, in order form the substituted acylating agent. This route avoids the problem of chlorine incorporation encountered in the chlorination route. One such process is described in the published EP-A-457599 which teaches the reaction of an enophile such as maleic anhydride with an ene such as a polybutene in a mole ratio of less than 3:1, preferably less than 1.9:1 (page 3, lines 46–47). In this publication, the preferred reaction pressure used is below 20 psi for a substantial period (at least the first three hours) after the commencement of the reaction (all the Examples) and the reaction is carried out in the presence of a catalyst such as aluminium trichloride. However, this thermal route generally gives lower conversions and leaves an undesirably high level of unreacted polybutene in the substituted acylating agent so produced. This is of the order of 24–27%, after recycle of the unreacted maleic anhydride, according to Example 9 of EP-A- 457599. The high levels of unreacted polybutenes are undesirable because they adversely affect the performance of the lubricating oil or fuel additives produced therefrom.

It has now been found that such problems of the processes of prior art can be mitigated by strictly controlling the reactant concentrations and the reaction conditions.

Accordingly, the present invention is a process for producing substituted acylating agents by the reaction of an enophile with an ene by the thermal route characterised in that:
a) the molar ratio of the enophile to the ene is greater than 3:1
and
b) the reaction pressure is held above 20 psig at least after addition of the enophile to the reaction is completed and is maintained substantially constant until at least 80% of the ene is converted by reaction with the enophile to the corresponding substituted acylating agent.

The enophile used in the process of the present invention is suitably an unsaturated dicarboxylic acid anhydride, preferably maleic anhydride.

The ene used in the process of the present invention may be polypropylene or a polybutene and is preferably a polybutene.

By the expression "polybutene" as used herein and throughout the specification is meant polybutenes, polyisobutenes or mixtures thereof which contain more than 50% of their double bonds in the form of terminal vinylidene groups, ie=$CH_2$ groups. Such polybutenes are commercially available in various grades under the trade name "ULTRAVIS®" from BP Chemicals Ltd. Such polybutenes are the so called "highly reactive polybutenes". Such polybutenes can be produced eg by the cationic polymerization of raffinate mixtures such as the so called "raffinate I". Raffinate I is a butadiene raffinate which is a by-product formed during the thermal or catalytic cracking (whether or not fluid) operation in a refinery and principally comprises C4 hydrocarbons, especially a mixture of butene-1, butene-2 and iso-butene along with some saturated hydrocarbons. More specifically, raffinate I comprises at least 10% w/w of iso-butene, from 20–40% w/w of butene-1 and butene-2, and from 10–20% w/w of butanes. One such method of producing such polybutenes is claimed and described in published EP-A-145235. A typical example of a highly reactive polybutene that can be used in the process of the present invention is ULTRAVIS® 30.

The mole ratio of enophile to ene in the reaction is at least 3:1, suitably greater than 3:1, preferably greater than 3.5:1, eg about 4–4.5:1. The reaction between the ene and the enophile is suitably carried out by rapidly and completely charging the enophile into the reactor. This is contrary to conventional industrial practice where the enophile is typically gradually added to the ene throughout the reaction. The enophile is suitably charged to the reactor containing the ene such that the addition of the enophile is complete before 50%, preferably before 25% of the reaction time has elapsed.

The reaction is suitably carried out at a temperature suitably greater than 220° C., preferably above 230° C., eg about 231°–232° C., and preferably with only a short time at high temperature for the ene eg polybutene prior to reaction and with a high reactor fill level.

The reaction pressure is raised to above 20 psig, preferably greater than 25 psig, eg 35 psig over atmospheric, typically as soon as the addition of the all of the enophile reactant to the reaction is completed and the reaction pressure is maintained at a substantially constant value throughout the reaction. By "throughout the reaction" is meant in this context until at least 80% of the ene reactant has been converted by reaction with the enophile to the corresponding acylating agent.

A feature of the thermal route is that the ene is reacted with the enophile is preferably carried out in the absence of any catalyst or any added chlorine.

A specific example of the substituted acylating agent according to the present invention is a polybutenyl succinic anhydride. This is produced by reacting at least 3 moles, preferably greater than 3 moles of the enophile ie maleic anhydride with a mole of an ene ie polybutene.

A feature of the present process is that it produces an acylating agent which has less than 20%, typically 15% or less of unreacted polybutene in the substituted acylating agent. This is not only achieved by controlling the aspects such as use of a reactive polybutene, high enophile to ene ratios and higher reaction pressures after the addition of the enophile is complete but this is further facilitated by maintaining a fast feed rate of the enophile eg maleic anhydride into the reactor. Thus according to a further embodiment, the present invention is a substituted acylating agent formed by the reaction of a highly reactive polybutene with maleic anhydride in a thermal route, characterised in that the unreacted polybutene content of said acylating agent is less than 20%.

The substituted acylating agents produced according to the process of the present invention are substantially chorine-free because chlorine is not used in any stage of the preparation of either the ene or the reaction thereof with the enophile.

The substituted acylating agents produced by the present invention can be further functionalised eg to the corresponding aminated or hydroxylated derivatives by reaction with an amine or a hydroxy compound respectively. Such derivatives, eg an imide produced by functionalisation using an amine, can be used as additives capable of improving the viscosity index, dispersancy or detergency properties of lubricating oils or fuels.

The present invention is further illustrated with reference to the following Examples:

EXAMPLE 1

A highly reactive polybutene, ULTRAVIS® 30 (vinylidene content 68%, Mn= 1375) was charged to a reactor and heated to 231° C. and held at this temperature for 3.5 hours. A 4.3:1 molar excess of maleic anhydride was charged to the reactor over a 1 hour period during heat up and the reactor pressure was maintained a 35 psig throughout the reaction period. The reaction product was stripped of unreacted maleic anhydride and then filtered. The amount of unreacted polybutene found in the resultant substituted acylating agent after filtration was found to be 15% w/w. There was no fouling of the reactor and the reactor could be re-used without resorting to any further clean up procedures.

EXAMPLE 2

A highly reactive polybutene, ULTRAVIS® 30 (vinylidene content 68%, Mn= 1375, 264 kg) was charged to a maleinisation reactor equipped with a reservoir of maleic anhydride located in a recycle loop. The polybutene was degassed under vacuum at 175° C. The reactor pressure was then brought to 15 psig by use of nitrogen gas. A 5.7:1 molar excess of maleic anhydride (116 kg) was charged to the reactor over a 2.5 hours. The reactor was and heated to 231°–232° C. during the addition of maleic anhydride over a period of 1 hr 55 minutes and maintained at this temperature for 3.5 hours. The reactor pressure was maintained at 15 psig during the addition of maleic anhydride. After the maleic anhydride addition was completed ie 35 minutes after the reaction temperature was attained, the reactor pressure was raised to 40 psig using nitrogen gas and maintained at this value until the end of the 3.5 hour reaction period at 231°–232° C. Thereafter, the reaction pressure was reduced and the excess unreacted maleic anhydride was stripped off under vacuum during four hours. The reaction product was readily removed from the reactor and then filtered. The amount of unreacted polybutene in the resultant substituted acylating agent after filtration was found to be 10% w/w. There was no fouling of the reactor and the reactor could be re-used without resorting to any further clean up procedures.

EXAMPLE 3

A highly reactive polybutene, ULTRAVIS® 10 (vinylidene content 66%, Mn= 950, 261 kg) was charged to a maleinisation reactor equipped with a reservoir of maleic anhydride located in a recycle loop. The polybutene was degassed under vacuum at 165° C. The reactor pressure was then brought to 15 psig by use of nitrogen gas and the reactor temperature raised to 175° C. A 3.05:1 molar excess of maleic anhydride (82.1 Kg) was charged to the reactor over a 2 hours, the reactor pressure being maintained a 15 psig during the addition of maleic anhydride. The reactor temperature was raised to 231°–232° C. half an hour before completion of the maleic anhydride addition. The reactor was maintained at this temperature for 3.5 hours. After the maleic anhydride addition was completed ie 30 minutes after the reaction temperature was attained, the reactor pressure was raised to 37 psig using nitrogen gas for the duration of the reaction. At the end of the 3.5 hr reaction period at 231°–232° C., the reaction pressure was reduced and the excess unreacted maleic anhydride was stripped off under vacuum during four hours. The reaction product was readily removed from the reactor and then filtered. The amount of unreacted polybutene in the resultant substituted acylating agent after filtration was found to be 15% w/w. There was no fouling of the reactor and the reactor could be re-used without resorting to any further clean up procedures.

Parapol®, a conventional polybutene (vinylidene groups <10%, 266 kg) was charged to the maleinisation reactor and degassed at 160° C. The reactor was filled with nitrogen gas to 15 psig and the temperature was raised to 184° C. whence the addition of a 4.3 molar excess of maleic anhydride (86 kg) was commenced and the addition carried out over a period of 2.5 hours. The reactor temperature was then raised during anhydride addition to 231°–232° C. half an hour before the final aliquot of the maleic anhydride was added and held at this temperature for 3.5 hours. The reactor pressure was raised to 40 psig with nitrogen gas when the addition of maleic anhydride was completed. At the end of the reaction period (3.5 hours) at 231°–232° C., the reactor pressure was reduced and excess unreacted maleic anhydride was stripped off under vacuum over four hours. The reaction product was removed from the reactor with considerable difficulty and then filtered. The filtered reaction product contained 28% w/w of unreacted polybutene and the reactor was found to be badly fouled with maleic anhydride resin. The reactor could not be re-used without undertaking a full clean up procedure.

Comparative Test 2 (not according to the invention)

Ultravis® 10, a highly reactive polybutene (vinylidene groups 66%, Mn= 950, 214 kg) was charged to a thermal maleinisation reactor equipped with a paddle stirrer. The polybutene was degassed under vacuum for two hours and then the reactor was filled with nitrogen gas to 15 psig and the temperature was raised to 175° C. 11 Kg of maleic anhydride was added to the reactor over a period of 20 minutes. The reactor temperature was then raised during anhydride addition to 220° C. and the addition of a further 55.2 kg of maleic anhydride was commencedat this higher temperature. The heating of the reactor was continued for about a further 1.25 hours during this addition until the temperature reached 232° C. The anhydride addition at a constant rate took a further 3.5 hours under a total reactor pressure of 15 psig so that 55.2 Kg of maleic anhydride was added over 4.75 hrs in total. After the addition of maleic anhydride was completed, ie after 3.5 hrs at the reaction temperature of 231°–232° C., the reactor pressure was released and a vacuum applied to remove the unreacted maleic anhydride from the reactor over four hours. Thereafter, the vacuum was broken and the reaction product was removed from the reactor and filtered through a bed of diatomaceous earth. The filtered reaction product contained 26% w/w of unreacted polybutene.

Comparative Test 3 (not according to the invention)

Hyvis® 10, a conventional polybutene (vinylidene groups <10%, Mn= 950, 200 g) was charged to an autoclave with a maleic anhydride (100 g, maleic anhydride 4.85 moles). The autoclave was degassed under vacuum for two hours and then the reactor was filled with nitrogen gas to 0 psig. The autoclave was then heated to 232° C. and held at this temperature whilst stirring the contents. The pressure in the autoclave was allowed to rise to 40 psig and the pressure was maintained within ± 2 psig of this value for the duration of the reaction which was 3.5 hours with constant stirring. The stirring was then stopped and the autoclave allowed to cool to 100° C. and the pressure was released. The contents of the autoclave were then removed and diluted in heptane and filtered. The autoclave was found to be completely fouled by tarry by-products. The total amount of tarry by-product was weighed and found to be 51.8 g. The amount of unconverted polybutene in the product was calculated therefrom and corresponded to about 29% w/w.

We claim:

1. A process for producing substituted acylating agents by the reaction by the thermal route of an enophile with an ene containing more than 50% of their double bonds in the form of terminal vinylidene groups characterized in that a) the molar ratio of the enophile to the ene is greater than 3:1 and b) the reaction pressure is held above 20 psig at least after addition of the enophile to the reaction is completed and is maintained substantially constant until at least 80% of the ene reactant has been converted by reaction with the enophile to the corresponding substituted acylating agent.

2. A process according to claim 1 wherein the enophile is an unsaturated dicarboxylic acid anhydride.

3. A process according to claim 1 wherein the enohpile is maleic anhydride.

4. A process according to claim 1 wherein the ene is polypropylene or a polybutene.

5. A process according to claim 1 wherein the mole ratio of enophile to ene in the reaction is greater than 3.5:1.

6. A process according to claim 1 wherein the reaction between the ene and the enophile is carried out by rapidly and completely charging the enophile into the reactor such that the enophile addition is complete before 50% of the reaction time has elapsed.

7. A process according to claim 1 wherein the reaction is carried out at a temperature greater than 220° C.

8. A process according to claim 1 wherein the reaction is carried out in the absence of any catalyst.

9. A process according to claim 1 wherein more than 3 moles of maleic anhydride is reacted with a mole of a polybutene such that the the amount of unreated polybutene in the resultant substituted acylating agent is less than 20% w/w of said acylating agent.

10. A substituted acylating agent formed by the reaction of a polybutene with maleic anhydride in a thermal route, characterised in that the unreacted polybutene content of said acylating agent is less than 20% and the acylating agent is substantially free of any chlorine.

11. An aminated or hydroxylated derivative of a substituted acylating agent, said derivatives being prepared by reaction of the substituted acylating agent acccording to claim 10 with an amine or a hydroxy compound respectively.

12. An additive for a lubricating oil or a fuel said additive comprising an aminated or hydroxylated derivative of a substituted acylating agent claimed in claim 11.

* * * * *

UNITED STATES PATENT AND TRADEMARK OFFICE
CERTIFICATE OF CORRECTION

PATENT NO. : 5,454,964
DATED : October 3, 1995
INVENTOR(S) : JOHN R. BLACKBOROW and JOHN McMAHON It is certified that error appears in the above-indentified patent and that said Letters Patent is hereby corrected as shown below:

Col. 4, between lines 16 and 17, insert
"Comparative Test 1 (not according to the invention)"

Signed and Sealed this

Second Day of April, 1996

Attest:

BRUCE LEHMAN

*Attesting Officer*  *Commissioner of Patents and Trademarks*